(12) United States Patent
Posselius et al.

(10) Patent No.: US 9,585,309 B2
(45) Date of Patent: Mar. 7, 2017

(54) HEADER HEIGHT CONTROL SYSTEM FOR AN AGRICULTURAL HARVESTER

(71) Applicant: CNH Industrial America LLC, New Holland, PA (US)

(72) Inventors: John H. Posselius, Ephrata, PA (US); Jeffrey B. Fay, II, Wilmington, DE (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/798,961

(22) Filed: Jul. 14, 2015

(65) Prior Publication Data

US 2017/0013777 A1    Jan. 19, 2017

(51) Int. Cl.
| | | |
|---|---|---|
| A01D 41/14 | (2006.01) | |
| A01D 46/08 | (2006.01) | |
| A01D 75/28 | (2006.01) | |
| A01D 47/00 | (2006.01) | |

(52) U.S. Cl.
CPC .......... *A01D 41/141* (2013.01); *A01D 47/00* (2013.01)

(58) Field of Classification Search
CPC .... A01D 41/06; A01B 69/008; A01B 69/001; G05D 1/00; G05D 1/0287
USPC .............................. 56/10.2 F, 10.2 E, 10.2 R
See application file for complete search history.

(56) References Cited

U.S. PATENT DOCUMENTS

| | | | |
|---|---|---|---|
| 3,908,345 A | 9/1975 | Oni et al. | |
| 4,136,508 A | 1/1979 | Coleman et al. | |
| 4,197,691 A | 4/1980 | Woodruff | |
| 4,507,910 A | 4/1985 | Thornley et al. | |
| 5,577,373 A | 11/1996 | Panoushek et al. | |
| 5,715,666 A * | 2/1998 | Huster | A01D 41/1278 56/10.2 F |
| 5,794,421 A | 8/1998 | Maichle | |
| 5,911,669 A * | 6/1999 | Stentz | A01D 41/1278 56/10.2 F |
| 6,244,024 B1 * | 6/2001 | Diekhans | A01B 69/008 172/4.5 |
| 6,389,785 B1 * | 5/2002 | Diekhans | A01B 69/001 172/4.5 |
| 6,397,569 B1 * | 6/2002 | Homburg | A01D 41/1278 56/10.2 F |
| 6,588,187 B2 | 7/2003 | Engelstad et al. | |

(Continued)

OTHER PUBLICATIONS

"Riteheight Automatic Header Height Control", Greentronics, Oct. 2013 (2 pages).

*Primary Examiner* — Árpád Fábián-Kovács
(74) *Attorney, Agent, or Firm* — Rebecca L. Henkel; Rickard K. DeMille

(57) ABSTRACT

An agricultural harvester includes a chassis, a header carried by the chassis, and a header height control system. The header is movable in upward and downward directions. The header height control system includes an electrical processing circuit, a non-contact sensor and a contact sensor. The non-contact sensor is positioned to sense a crop canopy ahead of the header. The contact sensor is positioned to sense an actual ground position relative to the header. The electrical processing circuit is coupled with and receives signals from each of the non-contact sensor and the contact sensor. The electrical processing circuit is operable to predict an upcoming ground position based upon the sensed crop canopy and actual ground position.

12 Claims, 1 Drawing Sheet

(56) References Cited

U.S. PATENT DOCUMENTS

| | | |
|---|---|---|
| 6,791,488 B2 | 9/2004 | Diekhans et al. |
| 6,826,894 B2 * | 12/2004 | Thiemann ............ A01D 41/141 |
| | | 56/10.2 E |
| 6,834,483 B2 | 12/2004 | Harvey |
| 7,155,888 B2 * | 1/2007 | Diekhans ........... A01D 41/1278 |
| | | 56/10.2 R |
| 7,191,582 B2 | 3/2007 | Bomleny |
| 7,222,474 B2 * | 5/2007 | Rayfield ............. A01D 41/141 |
| | | 56/10.2 E |
| 7,261,632 B2 | 8/2007 | Pirro et al. |
| 7,310,931 B2 * | 12/2007 | Gramm ................. A01D 41/06 |
| | | 56/208 |
| 7,401,455 B1 | 7/2008 | Cleodolphi |
| 7,647,753 B2 | 1/2010 | Schlipf |
| 7,730,700 B2 * | 6/2010 | Nathan ................ A01D 41/141 |
| | | 56/10.2 E |
| 7,992,369 B2 * | 8/2011 | Coers ................... A01D 41/141 |
| | | 56/10.2 E |
| 8,195,358 B2 * | 6/2012 | Anderson ................ G05D 1/00 |
| | | 340/988 |
| 8,452,501 B1 | 5/2013 | Lange et al. |
| 8,843,283 B2 | 9/2014 | Strelioff et al. |
| 2003/0000193 A1 * | 1/2003 | Beck .................... A01D 41/141 |
| | | 56/10.2 E |
| 2012/0029732 A1 | 2/2012 | Meyer |
| 2014/0041351 A1 | 2/2014 | Bollin et al. |
| 2014/0074360 A1 | 3/2014 | Rosa et al. |

\* cited by examiner

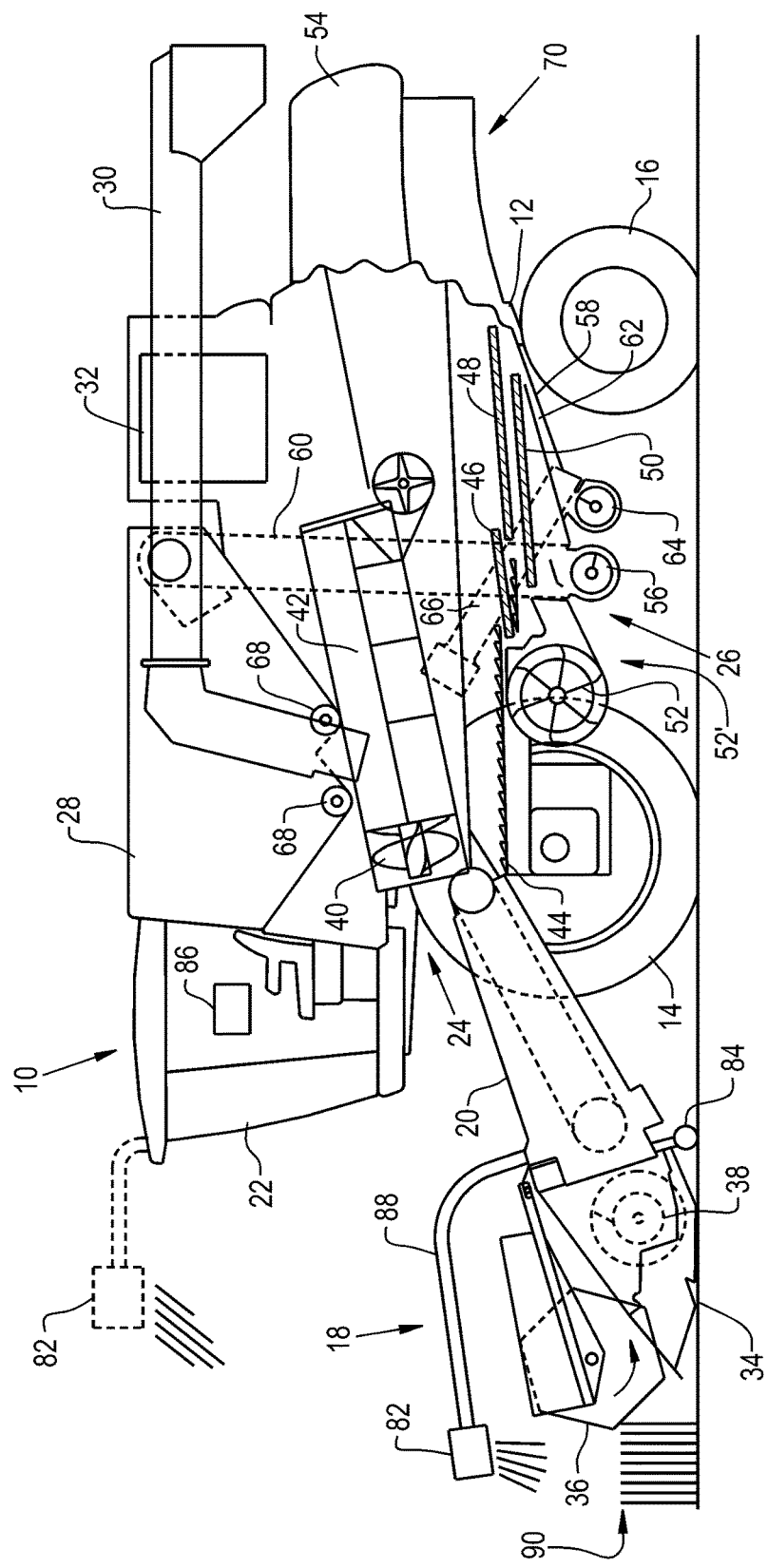

HEADER HEIGHT CONTROL SYSTEM FOR AN AGRICULTURAL HARVESTER

BACKGROUND OF THE INVENTION

1. Field of the Invention

The present invention relates to agricultural harvesters such as combines, and, more particularly, to height control systems for headers on such harvesters.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material, such as straw, from the threshing section proceeds through a residue system, which may utilize a straw chopper to process the non-grain material and direct it out the rear of the combine. When the grain tank becomes full, the combine is positioned adjacent to a vehicle into which the grain is to be unloaded, such as a semi-trailer, gravity box, straight truck, or the like; and an unloading system on the combine is actuated to transfer the grain into the vehicle.

The header is typically controlled with a header height control system to maintain the header at a predetermined distance relative to the ground. In the case of a cutting platform type header, sensors may be incorporated into the skid plates below the header to control the height of the header relative to the ground. It is also known to use a non-contact type sensor which can sense the crop canopy or the ground below the crop canopy.

What is needed in the art is a header height control system with improved header height control capabilities.

SUMMARY OF THE INVENTION

The present invention provides a header height control system with a non-contact sensor at the front of the header, a contact sensor at the rear of the header, and an electrical processing circuit which receives signals from each of the non-contact sensor and the contact sensor and predicts an upcoming ground position based upon the received signals.

The invention in one form is directed to an agricultural harvester, including a chassis, a header carried by the chassis, and a header height control system. The header is movable in upward and downward directions. The header height control system includes an electrical processing circuit, a non-contact sensor and a contact sensor. The non-contact sensor is positioned to sense a crop canopy ahead of the header. The contact sensor is positioned to sense an actual ground position relative to the header. The electrical processing circuit is coupled with and receives signals from each of the non-contact sensor and the contact sensor. The electrical processing circuit is operable to predict an upcoming ground position based upon the sensed crop canopy and actual ground position.

The invention in another form is directed to a header height control system for a header on an agricultural harvester. The header height control system includes a non-contact sensor positioned to sense a crop canopy ahead of the header, a contact sensor positioned to sense an actual ground position, and an electrical processing circuit coupled with and receiving signals from each of the non-contact sensor and the contact sensor. The electrical processing circuit is operable to predict an upcoming ground position based upon the sensed crop canopy and sensed actual ground position.

An advantage of the present invention is that the upcoming ground position can be predicted, based upon the sensed crop canopy ahead of the header.

Another advantage is that the height of the crop can be determined, based upon the sensed crop canopy and the sensed actual ground position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, wherein:

FIG. 1 is a side view of an embodiment of an agricultural harvester in the form of a combine which includes an embodiment of a header height control system of the present invention.

The exemplification set out herein illustrates an embodiment of the invention, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Although the agricultural harvester is shown in the form of a combine harvester, it is also to be understood that the harvester can take other forms. For example, the harvester can also be in the form of other types of self-propelled harvesters with height adjustable headers, such as self-propelled windrowers, forage harvesters, sugarcane harvesters, cotton pickers, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

According to an aspect of the present invention, a header height control system 80 includes a non-contact sensor 82, a contact sensor 84, and an electrical processing circuit 86.

The non-contact sensor 82 is positioned to sense a crop canopy ahead of the header 18. The non-contact sensor 82 is shown as being mounted to the header 18 via an arm 88, but could also be mounted at another suitable location. For example, the non-contact sensor 82 can be mounted to the operator cab 22, as indicated by the dashed line location in the drawing.

Moreover, the non-contact sensor 82 can be any suitable type of sensor which is capable of sensing the crop canopy 90 (i.e., the top of the crop being harvested). For example, the non-contact sensor 82 can be configured as an ultrasonic sensor, a radar sensor, a sonar sensor, a laser sensor, a microwave sensor, and/or a video camera.

The contact sensor 84 is positioned to sense an actual ground position relative to the header. The contact sensor 84 can be positioned at any suitable location onboard the header 18 and/or feeder housing 20, so that it contacts the ground and provides an output signal corresponding to the actual ground position. In the illustrated embodiment, the contact sensor 84 is a wheel which is mounted to the rear of the header 18, relative to a travel direction of the harvester. The contact sensor 84 can also be differently configured, such as an arm which contacts the ground.

The electrical processing circuit 86 is coupled with and receives signals from each of the non-contact sensor 82 and the contact sensor 84. The electrical processing circuit 86 is also coupled with suitable actuators for automatically raising and lowering the header 18, based upon control logic which is described below. The electrical processing circuit 86 can be any type of processing circuit, such as a digital controller and/or an analog processing circuit. Moreover, the electrical processing circuit 86 can be located at any suitable location onboard the harvester 10. In the illustrated embodiment, the electrical processing circuit 86 is located inside the operator cab 22 of the harvester 10.

The electrical processing circuit 86 can be operable to predict an upcoming ground position based upon the sensed crop canopy 90 and actual ground position. For example, the electrical processing circuit 86 can predict the upcoming ground position, dependent upon the sensed crop canopy and the height of the crop. Since the crop canopy height can be assumed to be fairly constant over a short distance, the upcoming ground position can be determined by subtracting the height of the crop from the sensed crop canopy. The height of the crop can be determined based on the distance between the sensed crop canopy and the sensed actual ground position. The electrical processing circuit 86 can also validate the sensed crop canopy dependent upon the sensed actual ground position.

During a harvesting operation, the non-contact sensor 82 senses the top of the crop canopy ahead of the header 18, and the contact sensor 84 senses the actual ground position at the rear of the header 18. Signals from the non-contact sensor 82 and the contact sensor 84 are outputted to the electrical processing circuit 86, which then utilizes the signals in a manner as described above to determine the crop height and the upcoming actual ground position. In this way, a predictive upcoming ground position can be used to control the height of the header 18. The electrical processing circuit 86 can output signals to appropriate actuators such as controllable hydraulic cylinders, etc. to control the height of the header 18.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester having a cab, comprising:
    a chassis;
    a header carried by the chassis, the header being movable in upward and downward directions; and
    a header height control system including
        an electrical processing circuit which controls movement of the header;
        a non-contact sensor connected to the electrical processing circuit and positioned on at least one of the cab and the header, the non-contact sensor positioned to sense a crop canopy position ahead of the header; and
        a contact sensor connected to the electrical processing circuit and positioned on the ground adjacent the header, the contact sensor positioned to sense an actual ground position relative to the header,
    wherein the electrical processing circuit receives signals of the crop canopy position ahead of the header from the non-contact sensor and signals of the actual ground position from the contact sensor on the ground adjacent the header, and a distance between the sensed crop canopy at a location ahead of the header and the actual ground position below the header is determined, thereafter an actual ground position is sensed and determined by the contact sensor at the location in which the crop canopy was sensed by the non-contact sensor, and the electrical processing circuit moveably adjusts the header for receiving upcoming crop based upon at least those determinations.

2. The agricultural harvester of claim 1, wherein the header includes a rotatable reel positioned over a cutter bar at a front of the header.

3. The agricultural harvester of claim 1, wherein a height of a crop is determined by the electrical processing circuit based upon the sensed crop canopy position and the sensed actual ground position.

4. The agricultural harvester of claim 3, wherein an upcoming ground position is determined by the electrical processing circuit based upon the sensed crop canopy position and the height of the crop.

5. The agricultural harvester of claim 4, wherein the upcoming ground position is determined by the electrical processing circuit by subtracting the height of the crop from the sensed crop canopy position.

6. The agricultural harvester of claim 1, wherein the contact sensor comprises one of a wheel and an arm.

7. A header height control system for a header on an agricultural harvester, the header height control system comprising:
    the header;
    a non-contact sensor positioned on the header to sense a crop canopy position ahead of the header;
    a contact sensor positioned on the ground adjacent the header to sense an actual ground position of the header; and
    an electrical processing circuit at least electrically connected to the header to control movement of the header, the electrical processing circuit coupled with the non-contact sensor and the contact sensor, wherein the electrical processing circuit receives signals of the crop canopy position ahead of the header from the non-contact sensor and signals of the actual ground position from the contact sensor on the ground adjacent the header, and a distance between the sensed crop canopy at a location ahead of the header and the actual ground position adjacent the header is determined, thereafter an actual ground position is sensed and determined by the contact sensor at the location in which the crop canopy was sensed by the non-contact sensor, and the electrical processing circuit moveably adjusts the header for receiving upcoming crop based upon at least those determinations.

8. The header height control system of claim 7, wherein the header includes a rotatable reel positioned over a cutter bar at a front of the header.

9. The header height control system of claim 7, wherein a height of the crop is determined by the electrical processing circuit based upon the sensed crop canopy position and the sensed actual ground position.

10. The header height control system of claim 9, wherein an upcoming ground position is determined by the electrical processing circuit based upon the sensed crop canopy position and the height of the crop.

11. The header height control system of claim 10, wherein the upcoming ground position is determined by the electrical processing circuit by subtracting the height of the crop from the sensed crop canopy position.

12. The header height control system of claim 7, wherein the contact sensor comprises one of a wheel and an arm.

* * * * *